United States Patent [19]
Moro et al.

[11] Patent Number: 5,748,462
[45] Date of Patent: May 5, 1998

[54] APPARATUS FOR CONTROLLING INVERTER RESISTANCE WELDING

[75] Inventors: Kyoji Moro; Hiroshi Shimada, both of Chiba-ken, Japan

[73] Assignee: Miyachi Technos Corporation, Chiba-ken, Japan

[21] Appl. No.: 690,103

[22] Filed: Jul. 31, 1996

[30] Foreign Application Priority Data

| Aug. 2, 1995 | [JP] | Japan | 7-216717 |
| Aug. 10, 1995 | [JP] | Japan | 7-225934 |

[51] Int. Cl.$^6$ .............. B23K 9/10; H02M 3/335; H02M 3/24; H02M 7/36
[52] U.S. Cl. .............. 363/97; 363/17; 363/134; 219/110
[58] Field of Search .............. 219/130.1, 130.21, 219/137 PS, 110; 363/15–21, 65–71, 95–97, 131–134, 16, 17, 24, 120

[56] References Cited

U.S. PATENT DOCUMENTS

| 3,916,282 | 10/1975 | Rothermel | 363/25 |
| 5,229,567 | 7/1993 | Kobayashi et al. | 219/110 |
| 5,349,157 | 9/1994 | Blankenship | 219/130.32 |
| 5,351,175 | 9/1994 | Blankenship | 363/16 |
| 5,386,096 | 1/1995 | Buda et al. | 219/110 |
| 5,449,877 | 9/1995 | Buda et al. | 219/110 |

*Primary Examiner*—Peter S. Wong
*Assistant Examiner*—Bao Q. Vu
*Attorney, Agent, or Firm*—Wenderoth, Lind & Ponack

[57] ABSTRACT

An inverter resistance welding control or power supply apparatus includes a clock generator which generates a clock signal defining a switching cycle of an inverter in a resistance welding machine, a device for preselecting a predetermined reference value corresponding to a desired current peak, a current sensor for detecting primary or secondary current of the welding machine, and an inverter control for controlling the inverter on a switching cycle-by-cycle basis. Specifically, the apparatus turns on the inverter in response to a leading edge of the clock signal, and turns the inverter off either when the current detected signal has reached the reference value or when the clock signal has reached a trailing edge. The control apparatus further includes a magnitude evaluator for measuring a magnitude of the current from the detected signal, which magnitude is expressed in root mean square, arithmetic mean or averaged peak value. The control apparatus further includes a reporter monitor which reports, based on the measured results of the current, information useful to determine normal or defective operation. There may further be provided a lack-of-secondary current detector for operatively and reliably detecting a lack of secondary current by monitoring the primary current.

11 Claims, 10 Drawing Sheets

| 1 | 10 | 05 | 10 |
|---|----|----|----|
|   | 0500 |  | 2000 |

(B)

| 1 | 10 | 05 | 10 |
|---|----|----|----|
| <GO> | 0499 |  | 1999 |

(C)

| 1 | 10 | 05 | 10 |
|---|----|----|----|
| <NG> | 0470 |  | 1890 |

(D)

NO CURRENT!!!

APPARATUS FOR CONTROLLING INVERTER RESISTANCE WELDING

BACKGROUND OF THE INVENTION

This invention generally relates to an apparatus for controlling the welding current of an inverter resistance welding machine.

For constant-current control of an inverter resistance welding machine in which primary or secondary current thereof generally matches a preselected value of desired current, a new technology, called "current peak control" or "current limiter control", has been proposed and developed for use.

In accordance with the principles of current peak control or current limiter control, the primary or secondary current of the welding machine is detected by detecting an instantaneous value thereof or a waveform thereof. In each one or one-half cycle of the inverter frequency, the detected signal, indicative of an instantaneous value of electric current, is compared with a predetermined reference value or "limiter" level. When the detected signal has reached the reference or limiter level, an inverter control switches the inverter into a nonconducting state. In principle, the current peak control or current limiter control assures a quick rise time of the welding current and prevents overshoot of the current since the current peaks are maintained.

A prior-art inverter resistance welding control apparatus with the current limiter control feature detects when the electric current of the welding machine has reached a reference level in each switching cycle of the inverter. Such a control apparatus lacks, however, a monitoring function or feature that detects or monitors a magnitude or quantity of actual welding current, e.g., an effective or root-mean-square value, or an average or arithmetic mean value. The effective value of the actual welding current is subject to changes in the workpiece load resistance and is also subject to variations in a supplied voltage. The prior art inverter resistance welding control apparatus with the current peak limiting feature, which relies on maintaining the feature of current peaks, has disregarded variations in the effective or average value of the actual welding current. Such variations can eventually lead to variations in the quality of the results or in the products yielded by the welding operation.

In accordance with the principles of the current limiter control, the electric current of the inverter welding machine "normally" reaches a reference or limiter level for each cycle of the inverter, thus maintaining current peaks. Depending on the operational condition or environment of the welding machine, however, e.g., dirty electrodes, increased resistance of a heated workpiece, or a drop in the supplied voltage, the electric current can fail to reach the limiter level within a cycle of the inverter.

The prior art current limiter type inverter resistance welding control apparatus does not provide for a monitoring of the operation of the current limiter control. Rather, a plurality of welding operations are repeatedly performed without determining whether each welding operation has been performed normally. Therefore, an operator must check the welded results or the final products by visual inspection. Clearly such visual inspection imposes a burden on the operator. Without it, the prior art current limiter type apparatus can repetitively yield defective products.

In inverter resistance welding machines, the secondary circuit may occasionally be troubled with electrical or mechanical disconnections. Such disconnections can result when a secondary conductor or cable, which connects a welding transformer to a welding electrode, is broken or when an insulator material is accidentally interposed between a workpiece and an electrode. In such cases, little or no current will flow in the secondary circuit even if an inverter in the primary circuit operates. In the prior art, the lack of the secondary current is determined from a null or zero value of the measured current.

This method may be reliable if the secondary current is directly detected. However, if the primary current is detected and used for constant current control, the method cannot reliably detect a lack of secondary current since, during operation of the inverter and in the absence of secondary current, magnetizing current still flows in the welding transformer, so that the primary current will not be zero. The presence of such primary current may be incorrectly interpreted as a presence of a secondary current.

SUMMARY OF THE INVENTION

It is, therefore, an object of the invention to provide an electric power supply for inverter resistance welding. The apparatus has constant-current control with current-peak limiting and is capable of monitoring a magnitude of the actual current and reporting this useful information to an operator. Another object of the invention is to provide a control apparatus for inverter resistance welding. The apparatus is of the current-peak limiting type and is capable of monitoring and reporting the operation of the current-peak limiter control. The present invention thus facilitates quality control of resistance welded products with increased productivity.

Another object of the invention is to provide an inverter resistance welding control that is capable of reliably detecting a lack of secondary current by directly monitoring the primary current, thereby facilitating quality control and increasing productivity.

In accordance with a first object of the invention, there is provided an inverter resistance welding electric power supply apparatus for controlling a switching operation of the inverter in such a manner that primary or secondary current of an inverter resistance welding machine generally coincides with a desired preselected current value. The apparatus includes clock generating means for generating a clock that defines a unit switching cycle of the inverter and a reference value preselecting means for preselecting a predetermined reference value corresponding to the preselected current value. The apparatus also includes current detecting means for detecting current during the welding operation. An inverter controlling means controls the inverter during each switching cycle in such a manner that the inverter is turned on in response to a leading edge of the clock and such that the inverter is turned off either when an output signal from the current detecting means has reached the reference value or when the clock has reached a trailing edge thereof. An average current value measuring means measures, from a detected current signal provided by the current detecting means, an average current value for each switching cycle. An output means outputs, based on the average current values provided by the average current value measuring means during the welding operation, current monitoring information useful to determine whether the welding operation has been performed normally or not.

The output means includes an average value computing means for computing an average value of integrated current values generated throughout the welding operation and display means for outputting the average value of the integrated current values from the average value computing means, as the current monitoring information.

In the alternative, the output means can also include monitoring value preselecting means for preselecting a desired monitoring value and determining means for comparing the average value of the integrated current values with the monitoring value to thereby determine whether the welding operating has been performed normally or not. A display means may be used for outputting the results of the determination.

In accordance with a second object of the invention, rather than the average current value measuring means, an effective current value measuring means may be provided for measuring an effective value of the current from the detected current signal provided by the current detecting means for a predetermined period of time for each switching cycle.

In accordance with a third object of the invention, rather than the reference value preselecting means, a limiter level preselecting means may be provided for preselecting a predetermined limiter level corresponding to the preselected current value. Also, rather than either the average current value measuring means or the effective current value measuring means, a current measuring means for measuring the value of the current at a time, during the cycle, when the inverter is turned off may be provided. A normal/defective determining means determines, based on data of the measured values provided by the current measuring means during the welding operation, whether the welding operation has been performed normally or not.

The normal/defective determining means includes average value computing means for computing an average value of the measured current values provided by the current measuring means during the welding operation, monitoring value preselecting means for preselecting a monitoring value for the normal/defective determination, and comparing means for comparing the computed average value from the average value computing means with the monitoring value.

In accordance with a fourth object of the invention, a primary current measuring means measures the primary current of the resistance welding machine and a lack-of-current detecting means compares a measured value of the primary current with a predetermined monitoring value that is less than a preselected value of desired current and greater than a value of magnetizing current of the welding transformer. In this way, the apparatus can detect a lack of secondary current of the resistance welding machine.

BRIEF DESCRIPTION OF THE DRAWINGS

The above and other objects, features, and advantages of the invention will become more apparent from the following description taken in conjunction with the drawings in which.

FIG. 10 shows visual presentations as visually displayed on a display in the second embodiment for reporting current monitoring results in accordance with the invention.

DETAILED DESCRIPTION OF THE PREFERRED EMBODIMENTS

A first embodiment of an inverter resistance welding control apparatus of the invention is shown in FIGS. 1 through 5.

Figure 1:
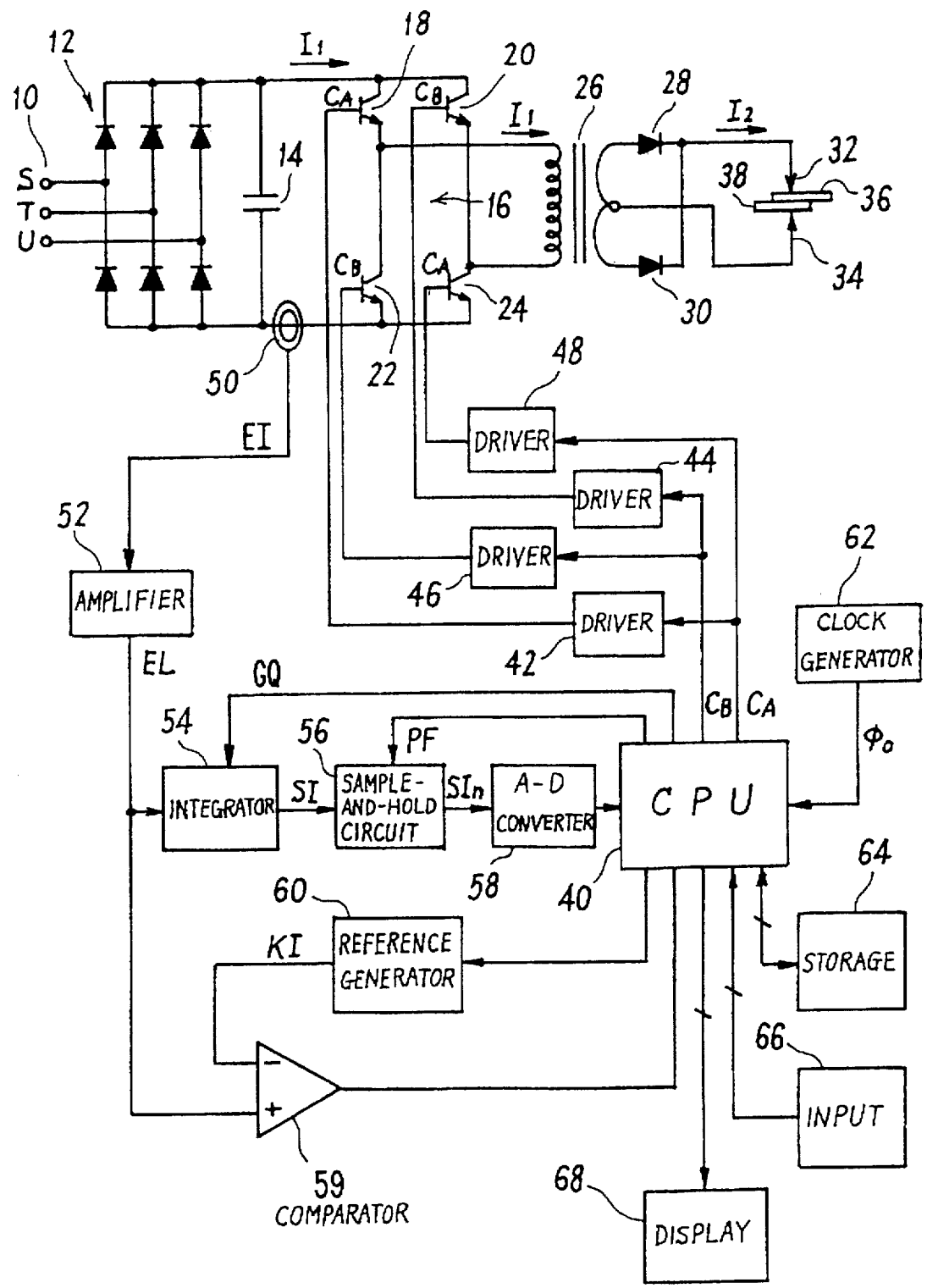
FIG. 1 is a block diagram showing an arrangement of a first embodiment of an inverter resistance welding control apparatus in accordance with the invention.

Referring first to FIG. 1, there is shown an arrangement of an inverter resistance welding machine including the embodiment of the inverter resistance welding control apparatus. In the illustrated resistance welding machine, a three-phase commercial AC power supply terminal 10 is connected to a three-phase rectifier 12 which provides rectified or DC current. The DC current is smoothed by a capacitor 14 and then supplied to an inverter 16.

The inverter 16 includes switching elements, such as giant transistors (GTR) 18, 20, 22, and 24, and converts the DC current into pulsed AC current having a high frequency. The switching operation of the inverter 16 is controlled by CPU 40 in the resistance welding power supply apparatus. The CPU 40 supplies control pulses $C_A$ and $C_B$ via drivers (42, 48) and (44, 46) to GTRs (18, 24) and GTRs (20, 22) respectively.

The high frequency AC voltage from the inverter 16 is applied across the primary coil of a welding transformer 26. A step-down AC voltage of high frequency is induced in the secondary coil of the welding transformer 26. A rectifier including a pair of diodes 28 and 30 converts the transformed AC current to DC current. The DC current is supplied, as welding current $I_2$ to workpieces 36 and 38 via welding electrodes 32 and 34.

A current sensor 50, such as a Hall current transformer, is provided in a primary conductor of the welding machine, extending between the primary capacitor 14 and the inverter 16. The current sensor 50 outputs a voltage signal EI (detected current signal) indicative of an instantaneous value or waveform of the primary current $I_1$.

The output of the current sensor 50 is connected via an amplifier 52 to an input of an integrator 54 and also to an input of a comparator 59. The integrator 54 integrates the current detected signal EI with respect to time. The operation of the integrator 54 is controlled by CPU 40 according to a control signal GQ supplied therefrom. The integrator 54 provides an integrated signal SI which is supplied to a sample-and-hold circuit 56.

The sample-and-hold circuit 56 samples and holds the integrated signal SI at an appropriate timing rate. The operation of the sample-and-hold circuit 56 is controlled by CPU 40 according to a control signal PF supplied therefrom. The output of the sample-and-hold circuit 56 is connected to an analog-to-digital converter 58 which converts an analog integrated signal sample SIn into a corresponding digital signal which is read by CPU 40 at predetermined timing rate.

Under the control of CPU 40, another input of the comparator 59 receives, from a reference value generator 60, a reference value (voltage) KI corresponding to a preselected current value (current peak value).

CPU 40 is connected to an inverter clock generator 62, a storage 64, an input device 66, a display 68 etc., directly or indirectly via interface circuits (not shown).

The clock generator 62 generates a master clock signal $\phi_0$ which is supplied to CPU 40. The clock signal $\phi_0$ has a frequency of, for example, 4 kHz, which defines a switching cycle of the inverter 16. The storage 64 includes a read only memory (ROM) and a random access memory (RAM). The ROM stores programs according to which CPU 40 is controlled. The RAM stores various preselected data, measured data, computed data etc. The input device 66 includes keys disposed on a control panel of a main control unit and an interface circuit which is connected to an external device via a communication cable (not shown). The display 68 includes a display unit and indicators disposed on the control panel of the control unit.

The input device 66 enters various data. In particular, the input device 66 is used to enter current peak data, which is indicative of a desired current limiter level or peak to be used for the constant-current peak control, data indicative of a desired current magnitude to be used for monitoring, (expressed in average or effective current) and a monitoring value, which is to be used for the determination of whether the welding operation is normal or defective. The entered data from the input device 66 is stored or registered in the storage 64. The monitoring value may be set to the desired current value or magnitude minus five percent thereof.

Figure 2:
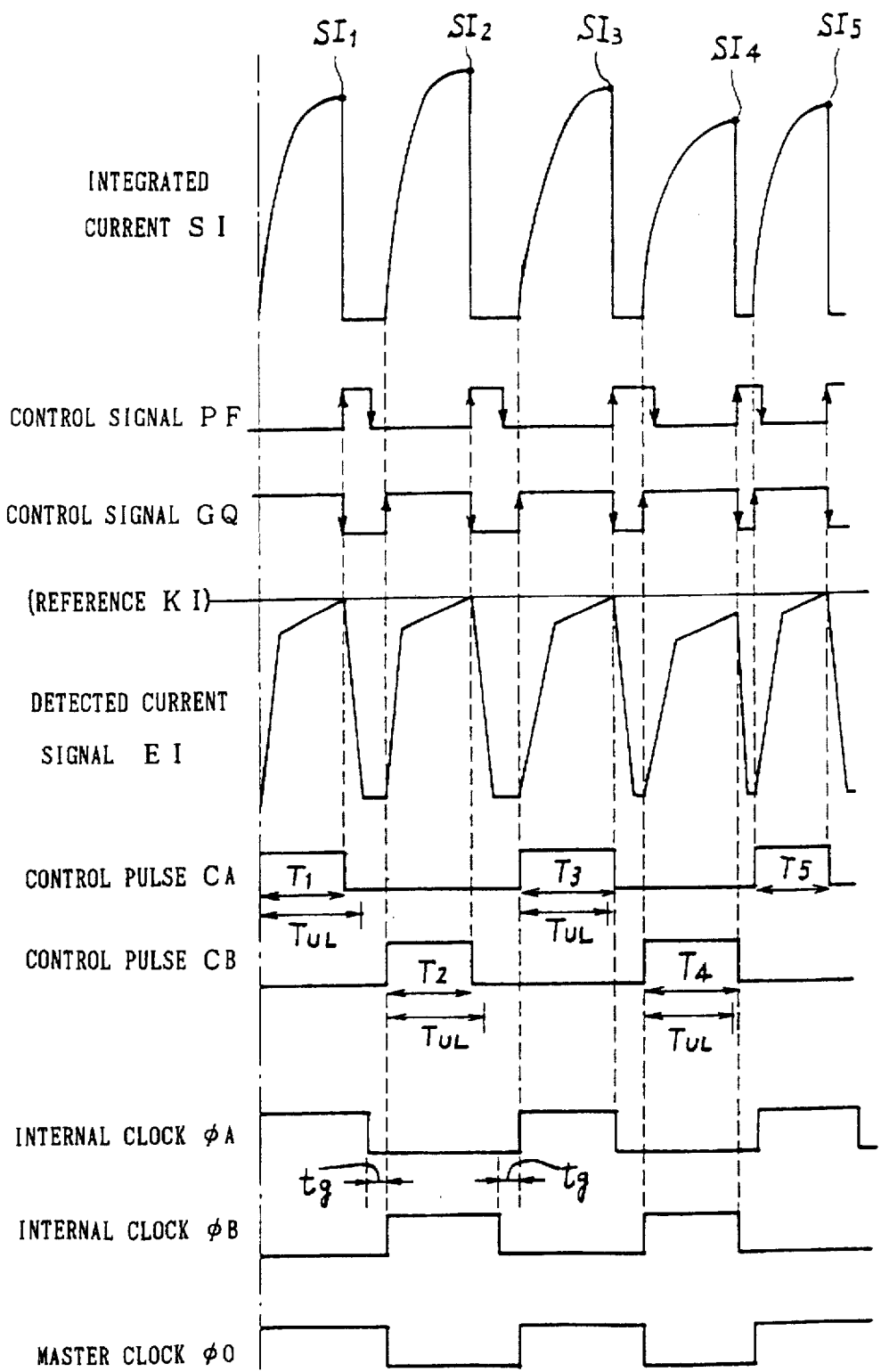
FIG. 2 is a diagram of signal waveforms showing peak-current control and current monitoring in the arrangement of FIG. 1.
Figure 3:
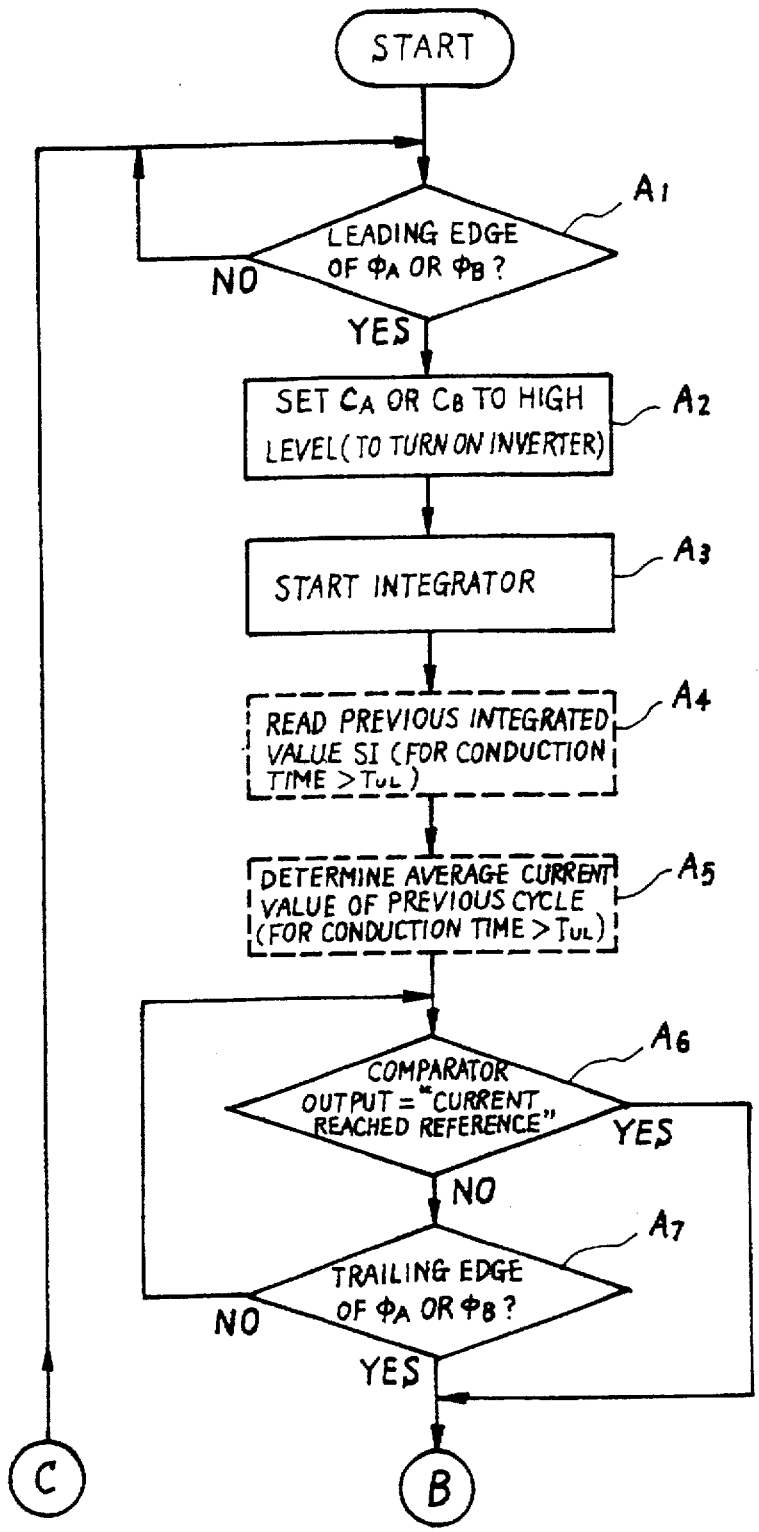
FIG. 3 and FIG. 4 are flowcharts of a main process executed by a CPU, showing an operation of the first embodiment of FIG. 1 in accordance with invention.
Figure 4:
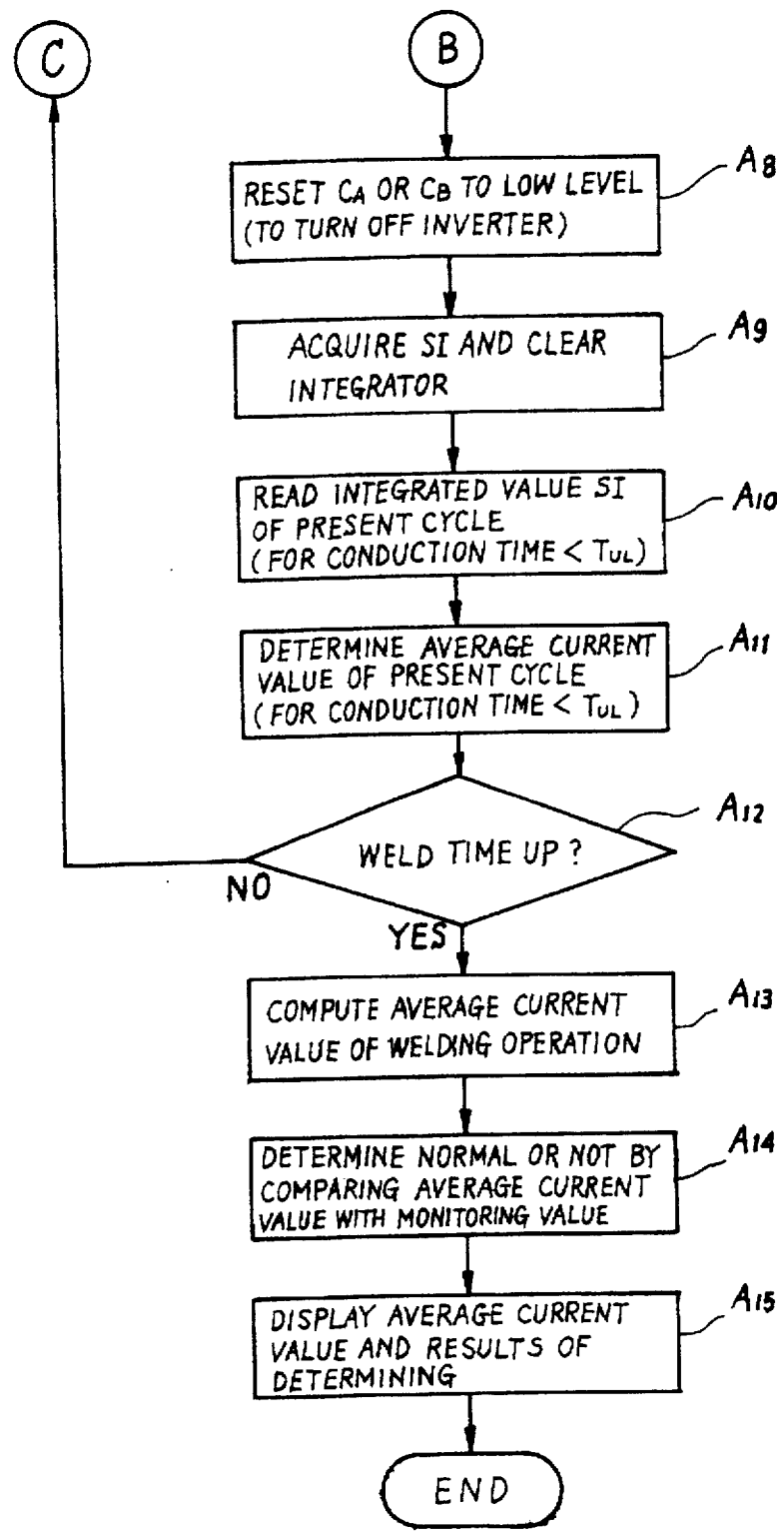

FIG. 2 shows signal waveforms of various parts of the arrangement of FIG. 1 to illustrate the current peak control feature and the current monitoring feature of the invention. FIGS. 3 and 4 are flowcharts of a weld and report routine executed by CPU 40, thus showing the operation of the control apparatus in FIG. 1. The operation of the first embodiment will now be described with reference to FIGS. 2 through 4.

During a welding operation, CPU 40 receives the master clock signal $\phi_0$ from the inverter clock generator 62 and generates therefrom, a two-phase internal clock signal $\phi_A$ and $\phi_B$. Using two-phase internal clock signals $\phi_A$ and $\phi_B$ CPU 40 alternately produces inverter control pulses $C_A$ and $C_B$.

One of the control pulses, $C_A$, is supplied to the control inputs of GTR18 and GTR24 in the inverter 16 via drivers 42 and 48. The GTR 18 and GTR 24 turn on in response to a leading edge of the control pulse $C_A$ and are placed in conduction until the control pulse $C_A$ switches back to the low level. Thus, a high-level pulse of the control pulse $C_A$ essentially specifies the conduction interval of the GTR 18 and the GTR 24. When GTR 18 and GTR 24 are conducting, primary current $I_1$ having a positive polarity flows through the primary coil of the welding transformer 26. Another control pulse $C_B$ is supplied to GTR 20 and GTR 22 in the inverter 16 via the drivers 44 and 46. A high-level pulse of the control pulse $C_B$ essentially specifies an interval during which the GTR 20 and the GTR 22 are conducting. When GTR 20 and 22 are placed in conduction, primary current $I_1$ having a negative polarity flows through the primary coil of the welding transformer 26.

There is provided a time margin or difference, tg, between the two-phase internal clock signals $\phi_A$ and $\phi_B$. The time margin value tg is chosen to assure a phase or time difference between the control pulses $C_A$ and $C_B$ to safely prevent the inverter 16 from short-circuiting.

During operation of the inverter 16, pulsed current $I_1$ flows into the inverter 16 and is thus detected by the current sensor 50 which generates an analog signal EI (detected current signal) indicative of an instantaneous value or waveform of the primary current I1.

Referring to FIG. 3, for example, CPU 40 responds to the leading edge of the clock signal $\phi_A$ (step $A_1$) and sets the control pulse $C_A$ to high level to thereby turn on GTR 18 and GTR 24 (step $A_2$). The turning-on of the GTR 18 and the GTR 24 causes a primary current $I_1$ to rise. At the same time CPU 40 sets the control signal GQ to high to start the integrator 54 (step $A_3$).

After executing the steps $A_2$ and $A_3$, CPU 40 may read a previous integrated current sample $SI_{n-1}$ from the sample-and-hold circuit 56 via the analog-to-digital converter 58, as shown in step $A_4$. The previous sample is read if a previous conduction interval of the previous cycle has exceeded a limit $T_{UL}$. From the integrated current value $SI_{n-1}$ of the previous cycle and from the previous conduction interval or pulse width $T_{n-1}$, CPU 40 computes an average or arithmetic mean value $MI_{n-1}$ of the electric current of the previous cycle (step $A_5$). The average value $MI_{n-1}$ is recorded into the storage 64.

As the primary current $I_1$ normally develops or increases during a $\phi_A$ clock cycle, the detected signal EI may reach the reference value KI. Then the output of comparator 59 changes to a high level from a low level. In response to the change of the level of the output of comparator 59 (step $A_6$), CPU 40 changes the control pulse $C_A$ to a low level to thereby turn off GTR 18 and 24 (step $A_8$).

Depending on an operational condition, such as increased resistance of the secondary circuit or a drop in the supplied three-phase AC voltage, the primary current $I_1$ might not develop sufficiently, so that the detected current signal EI will not reach or exceed the reference value KI within that cycle. Then, CPU 40 will respond to a trailing edge of the clock signal $\phi_A$ (step $A_7$), changing the control pulse $C_A$ to low level to thereby forcibly turn off GTR 18 and GTR 24 (step $A_8$). The primary current $I_1$, goes down or releases in response to the turning-off of the GTR 18 and GTR 24.

At the same time CPU 40 causes the sample-and-hold circuit 56 to hold an integrated current value $SI_n$ from the integrator 54 by sending a high-level control signal PF thereto, and then clears the integrator 54 by sending a low-level control signal GQ thereto (step $A_9$).

Then CPU 40 may read, within the present $\phi_A$ clock cycle, the output (integrated current value $SI_n$) of the sample-and-hold circuit 56 via the analog-to-digital converter 58 if the conduction interval or pulse width Tn of the present cycle was less than the upper limit $T_{UL}$ (step $A_{10}$). From the present integrated current value $SI_n$ and the present current conduction interval or pulse width Tn, CPU 40 computes the average or arithmetic mean value $MI_n$ of the electric current of the present cycle (step $A_{11}$). The average value $MI_n$ of the present cycle is recorded into the storage 64. The conduction pulse interval Tn of the present cycle indicates the pulse width of a present high-level pulse of the control signal $C_A$. CPU 40 may measure the current conduction interval Tn by counting or measuring the time from a leading edge of the control pulse $C_A$ to the next trailing edge thereof.

During a $\phi_B$ clock cycle, CPU 40 supplies a high-level pulse of the control pulse $C_B$ to the GTR 20 and the GTR 22 in the inverter 16 in the manner as described with respect to the $\phi_A$ clock cycle. In this manner, on a cycle-by-cycle ($\phi_A$ -by- $\phi_B$) basis, CPU 40 performs constant-current peak control and a process of determining or measuring the average or arithmetic mean value of the current.

After the welding operation has been completed (step $A_{12}$), CPU 40 computes an overall average value MI, from all records in the storage 64, i.e., average or arithmetic mean values $MI_1$, $MI_2$, etc., for all cycles of the welding operation (step $A_{13}$). Then CPU 40 compares the entire cycle or overall current average value MI with a preselected monitoring value DI (normal limit) which may be equal, for instance, to the preselected value of a desired average current minus 5 percent thereof. If MI is greater than or equal to DI, CPU 40 determines the present welding operation to be normal whereas if MI is smaller than DI, it determines the present welding operation to be defective (step $A_{14}$). Then CPU 40 causes the display 68 to visually display the results of the determination as well as the overall current average value MI (step $A_{15}$).

In this manner the present inverter resistance welding control apparatus measures parameter representative as a parameter representative of a magnitude of the actual electric current while performing current peak limiting control, and it determines whether the measured average current value is within a normal range or not. Therefore, the present control apparatus can provide current monitoring information useful to determine whether the welding operation has been performed normally or not. In doing so, the present control apparatus can contribute to improved quality control of the resistance welding and can provide a highly reliable current peak control.

In particular, the present embodiment checks if the current has failed to reach a reference peak level within a cycle, and measures an average or effective current value, and is therefore capable of successfully providing useful and reliable current monitoring information.

Figure 5:
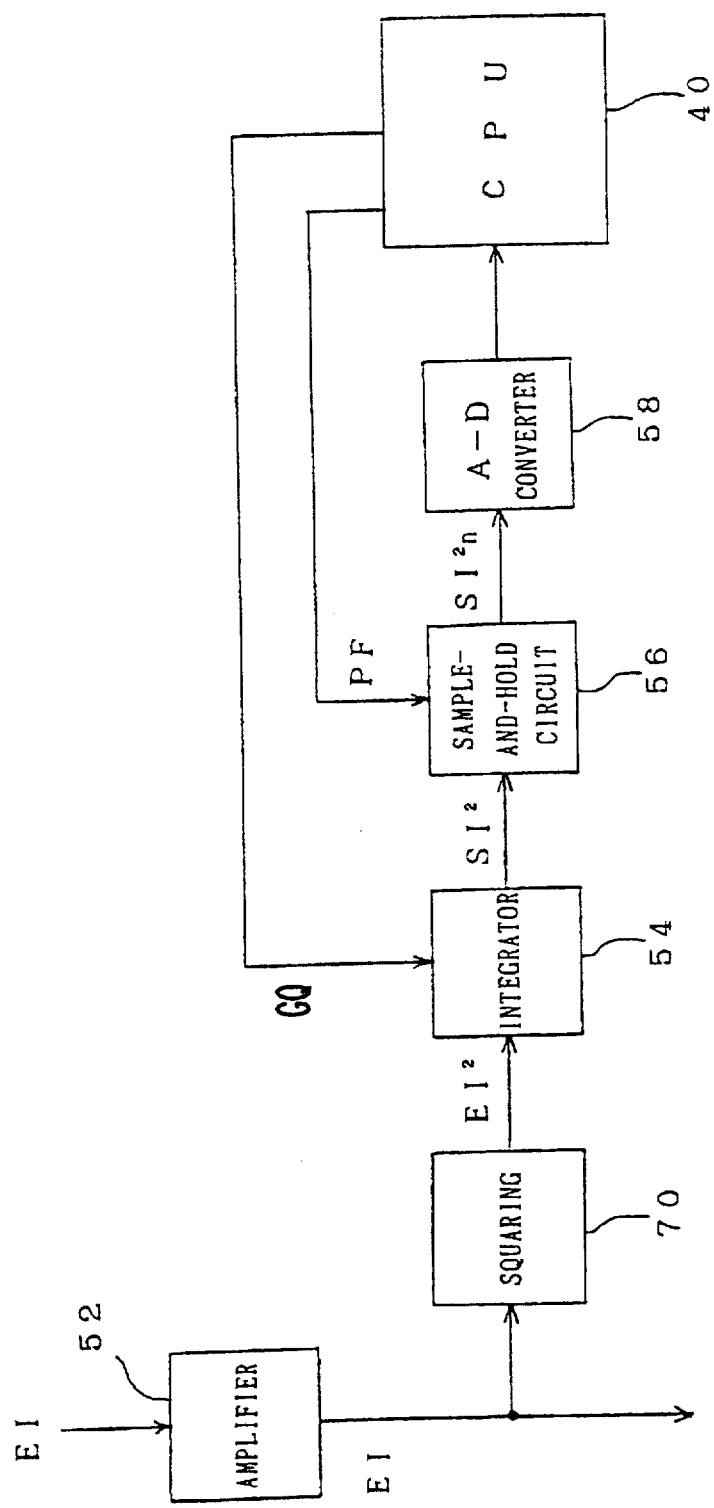
FIG. 5 is a block diagram of a modified arrangement for determining an effective value of electric current in accordance with the invention.

In the present embodiment, the arithmetic mean or average value of the current is measured as a parameter to be monitored. The apparatus may be modified to measure or determine an effective value of the actual current. FIG. 5 shows an arrangement for determining an effective value of the actual electric current.

Referring to FIG. 5, a squaring circuit 70 is interposed between the amplifier 52 and the integrator 54. The squaring circuit 70 squares the input signal or detected current signal instantaneous values EI. The integrator circuit 54 and sample-and-hold circuit 56 operate at appropriate timings, as in the first embodiment, according to control signals GQ and PF. Thus, CPU 40 reads an integrated value of squared instantaneous current values, $SI^2$, rather than an integrated value SI of instantaneous current values as in the first embodiment. From the data $SI^2$, CPU 40 computes a root thereof to thereby obtain an effective value of electric current.

In the above or first embodiment, the integrator 54 integrates the detected current signal EI for a time period which spans from the start of current to the point when the current reaches the reference level. This time period corresponds to the pulse width of a high-level pulse of the control pulse $C_A$ or $C_B$. This measuring method ignores or disregards that portion of the electric current which falls to zero from the reference level. However, the falling current does not essentially affect the weld quality so that excluding the current falling portion from the measurement of current (average or effective value) will not affect the accuracy of the monitoring information or the determination of the normal or defective welding operation.

It is, of course, very easy to include the current falling portion into the measurement. This is accomplished by terminating the integrating operation of the integrator 54 and by starting the sample and hold operation of the sample-and-hold circuit 56 at a trailing edge of internal clock $\phi_A$ or $\phi_B$ instead of at a trailing edge of control pulse $C_A$. By extending or deferring an end of the integrating operation in this manner, the integrated signal from the integrator 54 includes the current falling portion, which is thus reflected in the measured results, such as current average (arithmetic mean) value, or effective value of the electric current.

In the above embodiment, the integrator 54, sample-and-hold circuit 56, comparator 59, reference generator 60, and squaring circuit 70, etc., are implemented by analog circuits. They may however be implemented by digital circuits, either partly or entirely. The function of these circuits may also be implemented by a software program controlling the CPU.

In the above embodiments, to provide current monitoring information, an overall or entire average value of the measured data is determined, for all cycles of the weld time throughout the welding operation, and the entire measured data or the entire average current value is used to determine normal/defective welding operation. It may however be modified to use measured data on a cycle-by-cycle basis for normal/defective weld determination. The output of the current monitoring information can be presented using a display panel. A printer can also be used to provide a print-out (hard copy) presentation. In addition, such output may be provided by or presented on not only a main control unit but also using a remote terminal unit via a communication interface.

A second embodiment of an inverter resistance welding control apparatus will now be described with reference to FIGS. 6 through 10. Like components and functions are designated by like numerals or symbols throughout the drawings.

Figure 6:
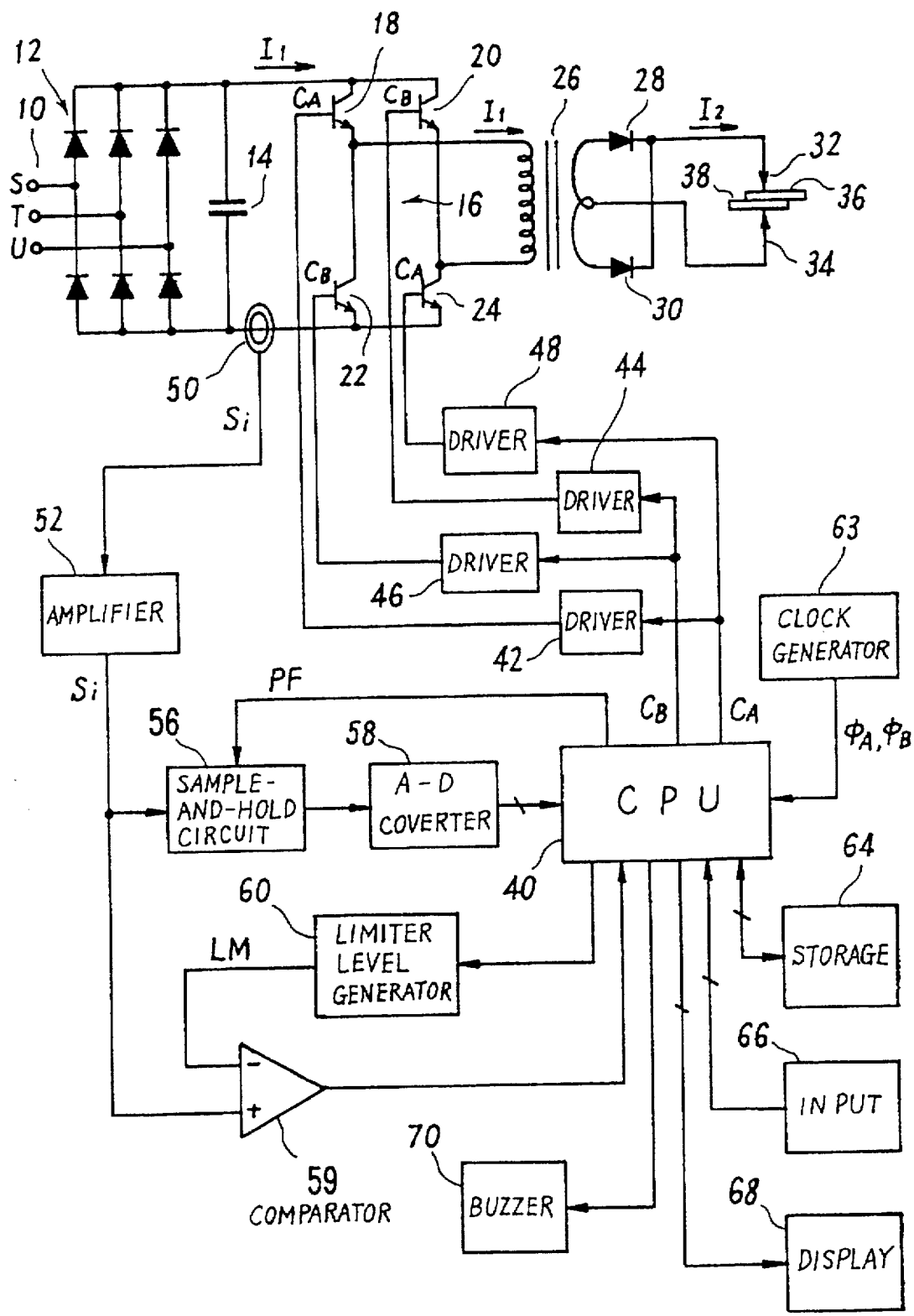
FIG. 6 is a block diagram showing an arrangement of a second embodiment of an inverter resistance welding control apparatus in accordance with the invention.

Referring to FIG. 6, the output of the amplifier 52 is connected to an input of the comparator 59. The output of the amplifier 52 is also connected to the input of the sample-and-hold circuit 56. Another input of the comparator 59 receives a limiter level (reference) signal LM from the limiter level (reference) generator 60 under the control of CPU 40. The reference voltage signal LM represents a preselected value of a desired current peak. A clock generator 63 supplies a two-phase clock signal $\phi_A$, $\phi_B$ having a frequency of, for example, 4 kHz, which specifies a switching cycle of the inverter 16. A buzzer 70 is also connected to CPU 40 via an interface circuit (not shown).

In the illustrated embodiment, the input device 66 enters a first monitoring value for normal/defective weld determination and a second monitoring value for the determination of a lack of secondary current. These monitoring values are stored and registered into the storage 64. The first monitoring value [Ij] specifies the normal range of current which may be, for instance, the preselected value of the desired current plus or minus 5 percent. The second monitoring value [Ik] may preferably be set to a value (for instance, 350 amperes, which is the value of Ik converted to and expressed in terms of the secondary circuit) slightly greater than the magnetizing current of the welding transformer 26 (which may be 200 amperes, which is the value of the magnetizing current converted to and expressed in terms of the secondary current).

Figure 7:
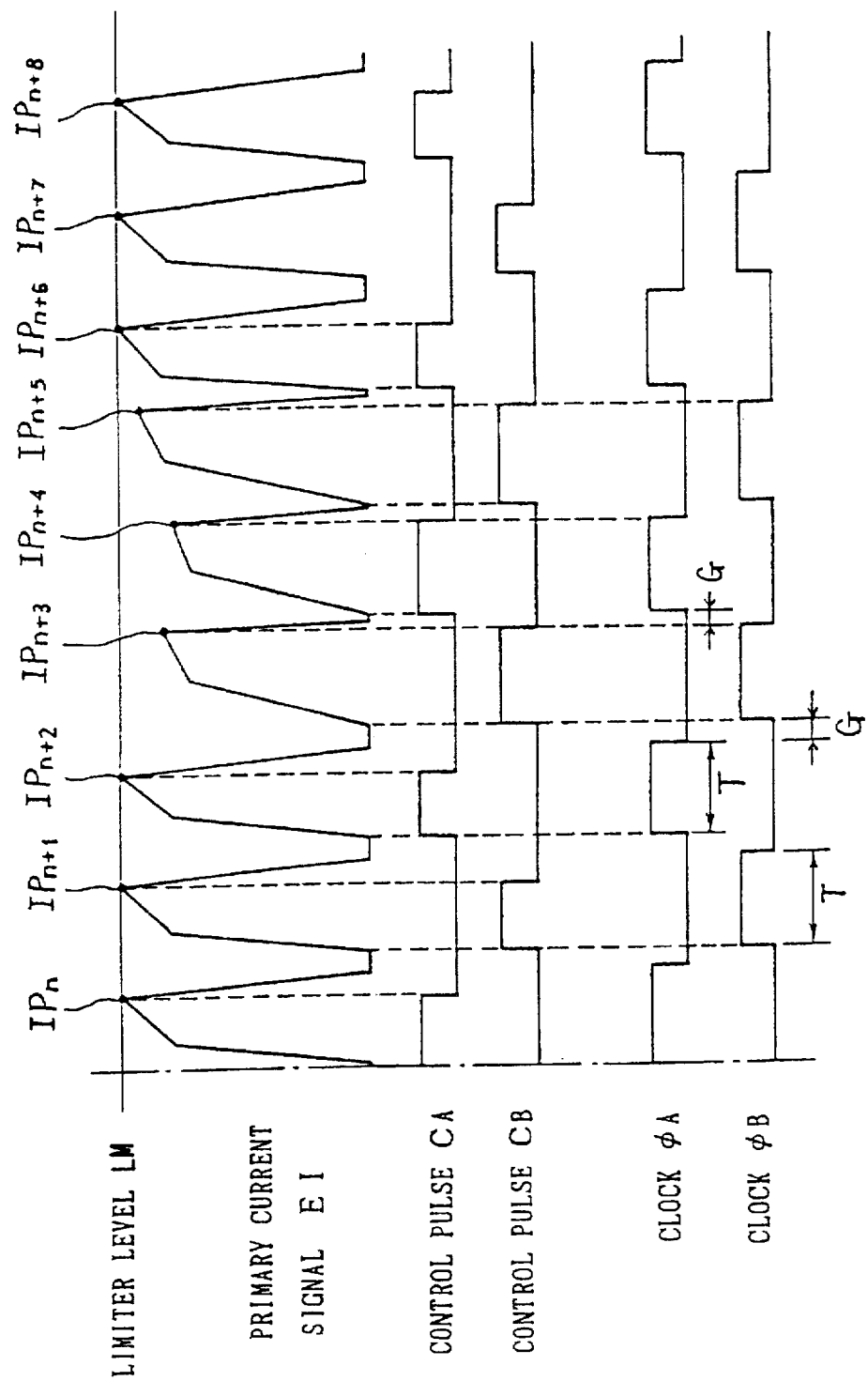
FIG. 7 is a diagram of signal waveforms showing current limiter and monitor functions in the arrangement of FIG. 6.
Figure 8:
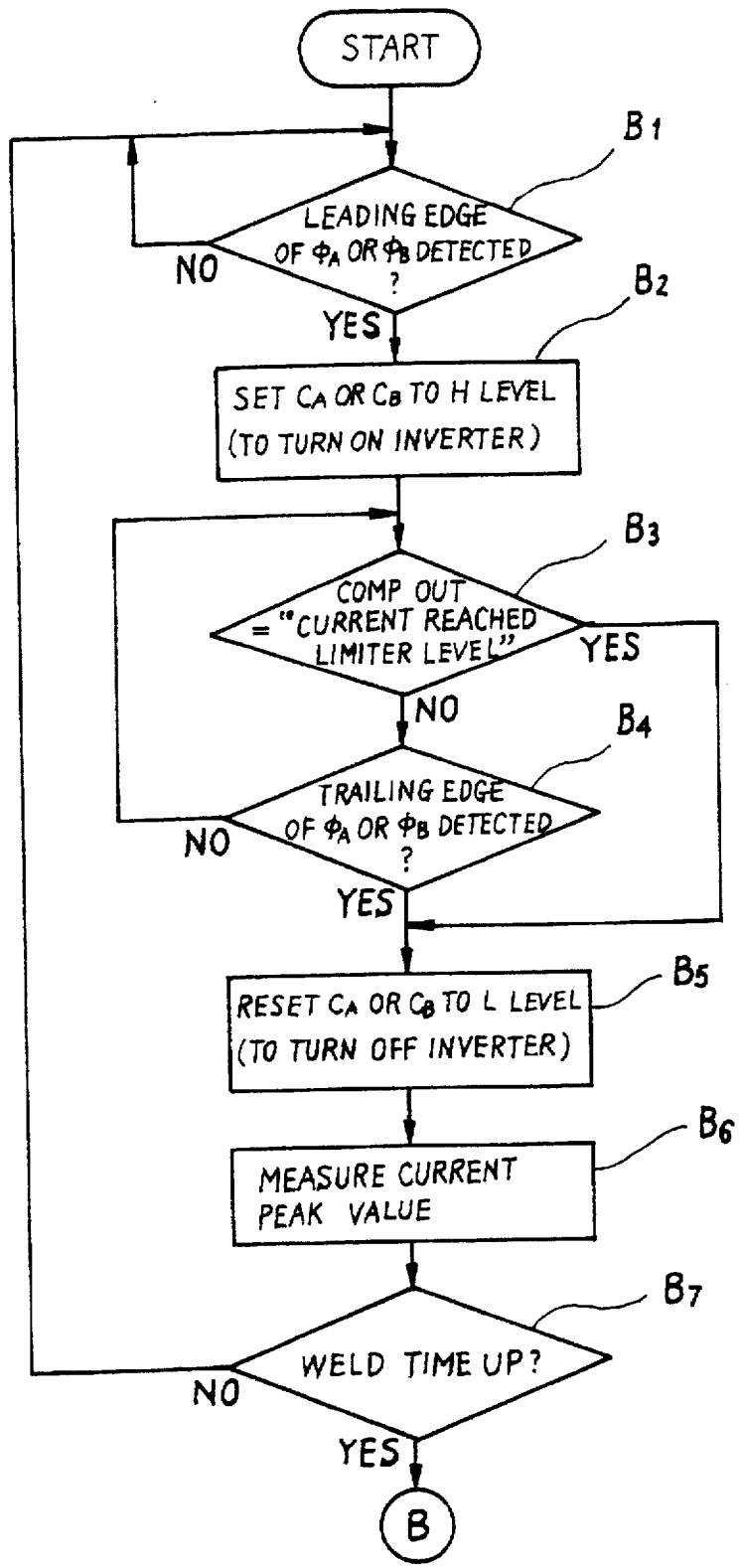
FIG. 8 is a flowchart of a weld routine of the second embodiment of FIG. 6, executed by CPU during a welding operation, in accordance with the invention.
Figure 9:
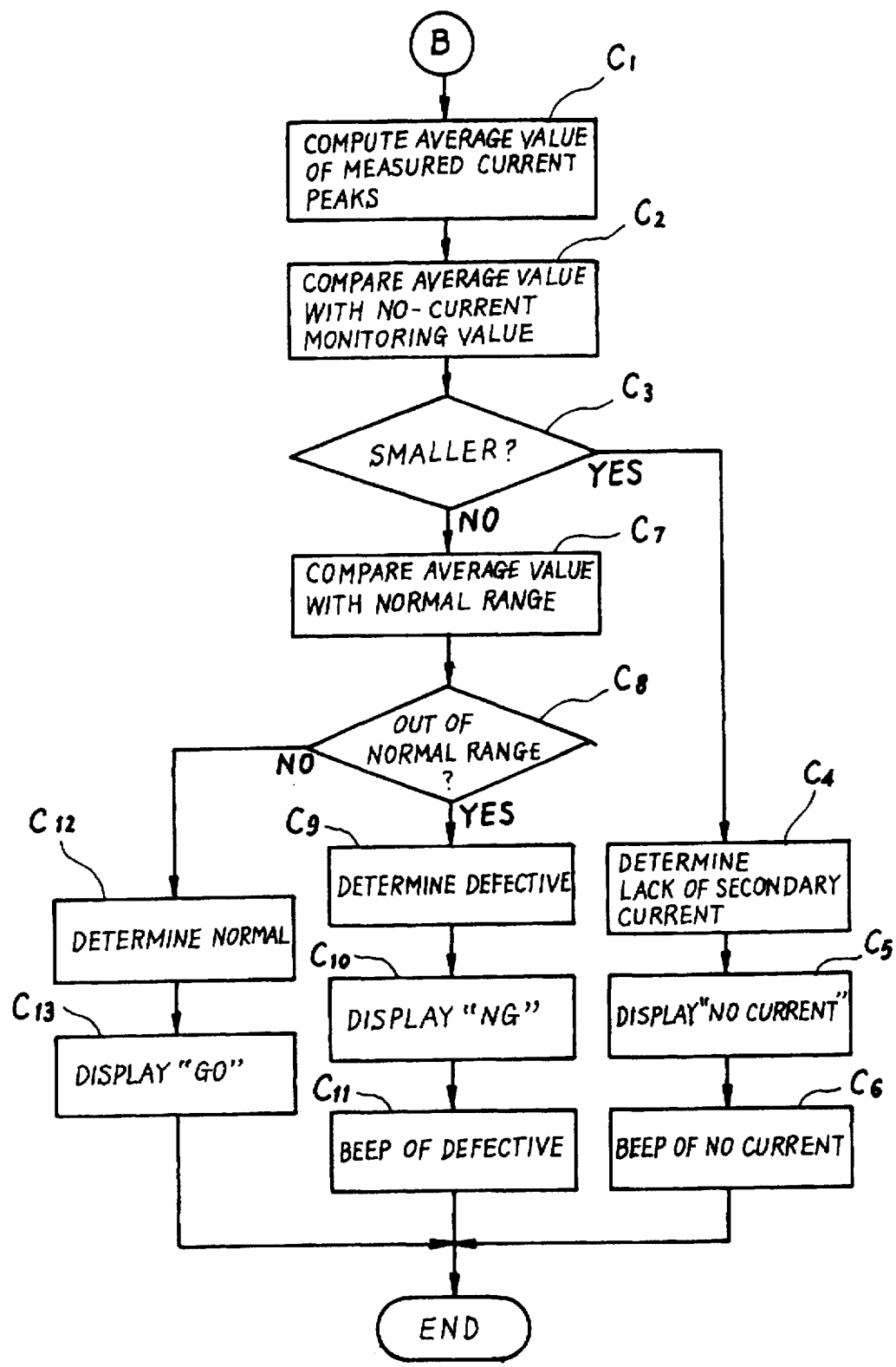
FIG. 9 is a flowchart of a report routine of the second embodiment of FIG. 6, executed by CPU after a welding operation, in accordance with the invention.

Referring to FIG. 7, there are shown signal waveforms in the arrangement of FIG. 6. They illustrate the current limiter feature and the monitoring feature of the second embodiment of the invention. FIGS. 8 and 9 are flowcharts of routines executed by CPU 40, showing an operation of the second embodiment. FIG. 10 shows visual presentations displayed on a screen of the display 68 in the present control apparatus. An operation of the second embodiment will now be described by reference to FIGS. 7 through 9.

When CPU 40 receives a clock $\phi_A$ from the clock generator 63 (step $B_1$), CPU 40 sets the control signal $C_A$ high at a leading edge of $\phi_A$ to thereby turn on GTR 18 and GTR 24 (step $B_2$). In response to the turning-on of the GTR 18 and GTR 24, the primary current $I_1$ generates and develops.

When the primary current $I_1$ develops "normally", the detected signal EI thereof will reach, within a present cycle, the limiter level LM, thus changing the output of comparator 59 to a high-level from a low-level. In response to the leading edge (step $B_3$), CPU 40 sets the control signal $C_A$ low to thereby turn-off the GTR 18 and GTR 24 (step $B_5$).

Depending on an operational condition, such as an increased resistance of the secondary circuit or a drop in the supplied three-phase AC voltage, the primary current $I_1$ might not develop sufficiently so that the detected signal EI will not reach the limiter level LM within that cycle. In such a case, CPU 40 will see a trailing edge of the clock signal $\phi_A$ and then change the control signal $C_A$ to a low-level to forcibly turn off the GTR 18 and GTR 24 (steps B4 and B5). The turning-off of the GTR 18 and GTR 24 causes the primary current $I_1$ to fall.

At the same time, CPU 40 sets the control signal PF high, causing the sample-and-hold circuit 56 acquire the instantaneous value $IP_n$ of the detected current signal EI. The instantaneous value $IP_n$ is called a current peak value since it represents a maximum of the current waveform within a cycle. Then CPU 40 reads the current peak value $IP_n$ via the analog-to-digital converter 58 and stores it in the storage 64 at a predetermined storage location (step $B_6$).

In a cycle of clock $\phi_B$, CPU 40 supplies a high-level pulse of the control signal $C_B$ to the GTR 20 and GTR 22 in the inverter 16 when it has detected a leading edge of the clock signal $\phi_B$. The operation of CPU 40 during a cycle of clock $\phi_B$ is essentially identical with that of CPU 40 during a cycle of clock $\phi_A$. In this manner CPU 40 performs current limiter control and current peak ($IP_n$) measuring on a cycle-by-cycle basis.

After the welding operation (step $B_7$), CPU 40 computes, from all records of current peak data $IP_1$, $IP_2$, etc., of all cycles of the welding operation, an overall or entire current average value IPM thereof (step $C_1$). Then CPU 40 compares the entire current average value $IP_M$ with the second monitoring value [Ik] for a determination of a lack of secondary current (step $C_2$). If the $IP_M$ is less than [Ik] (step $C_3$), CPU 40 determines lack of secondary current in the secondary circuit (step $C_4$). Then CPU 40 causes the display unit 68 to visually display the message "NO CURRENT!!!" (step $C_5$). At the same time CPU 40 causes buzzer 70 to sound a predetermined beep to inform an operator nearby of the abnormal condition of no current in the secondary circuit (step $C_6$).

If the averaged current peak value $IP_M$ is found to be greater than or equal to the second monitoring value [Ik] at step $C_3$, CPU 40 compares the averaged peak value $IP_M$ with the first monitoring value [Ij] for normal/defective welding determination (step $C_7$). If the averaged peak value $IP_M$ goes out of the normal range [Ij] (for instance the desired peak value plus or minus 5 percent) (step $C_8$), CPU 40 determines defective welding operation (step $C_9$). Then CPU 40 causes display unit 68 to display a message indicating defective operation, for example, "NG" (step $C_{10}$), and controls the buzzer 70 to emit a predetermined beep or buzzing sound (step $C_{11}$), thus notifying a nearby operator of defective welding operation, implying defective welded results.

In the second comparing operation above (step $C_7$), if the averaged peak value $IP_M$ falls within the normal range [Ik] (for instance the preselected desired peak value plus or minus 5 percent) at step $C_8$, CPU 40 determines normal welding operation (step $C_{12}$). Then CPU 40 controls the display 68 to visually present the message "GO" indicating normal welding operation, meaning go ahead to the next welding operation (step $C_{13}$). In this case no buzzer sound is emitted because no inspection on the part of the operator is required.

Referring to FIG. 10, part (A) shows a visual presentation on the display screen, representing preselected values of the welding operation. In the visual presentation of part (A), a numeral "1", at top left, indicates a welding schedule number. A numeral "10", next to the schedule number indicates a first weld time expressed in milliseconds. The numeral "05" indicates a cool time in terms of milliseconds. The right numeral "10" indicates a second weld time in terms of milliseconds. In the second or bottom line, at the left, a numeral "0500" indicates a preselected value of the secondary current of the first welding operation, in units of kiloampere. The next right numeral "2000" indicates a preselected value of the secondary current of the second welding operation in terms of kiloamperes.

Parts (B) and (C) of FIG. 10 show monitoring presentations including monitored results of the welding operation. In part (B) of FIG. 10, in the second or bottom line, numerals "0499" and "1999" indicate measured values of the secondary current peak (average) of the first and second welding operations, respectively. Also, in part (C) of FIG. 10, in the bottom line, numerals "0470" and "1890" represent measured values of the secondary current peak (average) of the first and second welding operations, respectively. Since the ratio of the primary current $I_1$, to the secondary current 12 is essentially determined by the ratio of turns of the coils of the welding transformer 26, CPU 40 can simply compute a primary current selected value from a secondary current selected value and compute a secondary current measured value (secondary current peak average value) from a primary current measured value (primary current peak average value).

In this manner, the second embodiment of the inverter resistance welding control apparatus, which uses a current limiter control, detects an actual current peak value of each clock cycle during the welding operation. After the welding operation, the apparatus computes an average of current peak values, and compares it with a predetermined monitoring value for normal/defective welding determination to thereby determine whether the welding operation has been performed normally or not. The apparatus displays the results of the determination together with the current measured data (electric current peak averaged value).

In doing so, the operation of the current limiter control is monitored and displayed or output by means of a visual display unit or printer, thus eliminating the need for visual inspection by an operator, thereby contributing to improved quality control and increased productivity. Further, since the results of the monitoring are informed by a buzzer sound, an operator can easily detect such a buzzer sound without looking at the control panel, thus, the operator is easily informed of a defective welding operation so that the operability on the part of an operator will become more efficient. At the beginning cycles of welding operation, the electric current peak rises or develops from one cycle to another. Thus, those records of the measured current data from the beginning cycles can be excluded from the computation of the current peak averaged value. The measured current peak data from the ending cycles of the welding operation can also be excluded from the computation of the entire current peak average of the welding operation.

The second embodiment of the inverter resistance welding control apparatus also contemplates the magnetizing current of the welding transformer 26, as experienced in the entire absence of the secondary current. That is, the control apparatus preselects or determines a monitoring value as a function of the magnetizing current for detecting little or no secondary current. The control apparatus, which operates based on a current limiter control with a primary current feedback loop, compares the current peak average value with a monitoring value for detection and determination of no welding current. In doing so, the control apparatus can detect an abnormal condition in the secondary circuit i.e., a lack of the secondary current even from the primary circuit, without regard to the magnetizing current of the welding transformer 26, with high reliability. In addition, the control apparatus informs a nearby operator of such abnormal condition in the secondary circuit by means of a buzzer sound as well as a visual presentation, so that the operability will be significantly increased.

Whereas, in the second embodiment, the check for no secondary current is done after the welding operation, it can be modified so as to check it during the welding operation. In such a case, it may be preferred to stop the electric power supply by stopping the inverter operation immediately after little or no secondary current has been detected. Various other modifications could be obvious within an ordinary skill in the art. For example, a current sensor 50 may be provided in a primary conductor between the inverter 16 and the welding transformer 26 at an output from the inverter 16. In such a case, the current sensor 50 generates a signal EI having an AC current waveform of the inverter 16 output. An absolute circuit may be connected to the output of the current sensor 50 to obtain a signal having a single polarity as shown in FIG. 7. To monitor the current limiter function or operation, a current sensor in the form of, for example, a toroidal coil may be provided in the secondary circuit to detect secondary current $I_2$ if desired. The illustrated embodiments and modifications described so far are only illustrative. Therefore, the scope of the invention should be limited solely by the appended claims.

What is claimed is:

1. An inverter resistance welding electric power supply control apparatus for controlling a switching operation of an inverter such that a primary or secondary current of an inverter resistance welding machine generally matches a desired preselected current value, comprising:

clock generating means for generating a clock that defines a switching cycle of the inverter, wherein said switching cycle occurs a plurality of times during a welding operation;

reference value preselecting means for preselecting a predetermined reference value corresponding to the preselected current value;

current detecting means for detecting a current during the welding operation and for generating a detected current signal representative thereof;

inverter controlling means for controlling the inverter for each switching cycle such that the inverter is turned on in response to a leading edge of the clock and such that the inverter is turned off either when said detected current signal from said current detecting means has reached said reference value or when the clock has reached a trailing edge thereof;

average current value measuring means for measuring, from said detected current signal, a plurality of average current values, one for each time said unit switching cycle occurs during the welding operation; and output means for outputting, based on said plurality of average current values, current monitoring information useful to determine whether the welding operation has been performed normally or not.

2. The inverter resistance welding electric power supply control apparatus of claim 1, wherein said output means comprises:

average value computing means for computing a welding operation average current value based on said plurality of average current values; and display means for outputting said current monitoring information, which comprises said welding operation average current value.

3. The inverter resistance welding electric power supply control apparatus of claim 1, wherein said output means comprises;

average value computing means for computing a welding operation average current value based on said plurality of average current values;

monitoring value preselecting means for preselecting a desired monitoring value;

determining means for comparing said welding operation average current value with said monitoring value to determine, and provide an indication of, whether the welding operating has been performed normally or not, wherein said current monitoring information comprises said indication.

4. An inverter resistance welding electric power supply control apparatus for controlling a switching operation of an inverter such that a primary or secondary current of an inverter resistance welding machine generally matches a desired preselected current value, comprising:

clock generating means for generating a clock that defines a switching cycle of the inverter, wherein said switching cycle occurs a plurality of times during a welding operation;

reference value preselecting means for preselecting a predetermined reference value corresponding to the preselected current value;

current detecting means for detecting a current during the welding operation and for generating a detected current signal representative thereof;

inverter controlling means for controlling the inverter for each switching cycle such that the inverter is turned on in response to a leading edge of the clock and such that the inverter is turned off either when said detected current signal from said current detecting means has reached said reference value or when the clock has reached a trailing edge thereof;

effective current value measuring means for measuring, from said detected current signal, a plurality of effective current values, one for each time said unit switching cycle occurs during the welding operation; and output means for outputting, based on said plurality of effective current values, current monitoring information useful to determine whether the welding operation has been performed normally or not.

5. The inverter resistance welding electric power supply control apparatus of claim 4, wherein said output means comprises:

average value computing means for computing an average value of said effective current values; and display means for outputting said current monitoring information, which comprises said computed average value of said effective values.

6. The inverter resistance welding electric power supply control apparatus of claim 4, wherein said output means comprises:

average value computing means for computing an average value of said effective current values;

monitoring value preselecting means for preselecting a desired monitoring value;

determining means for comparing said computed average value of said effective current values with said monitoring value to determine, and provide an indication of, whether the welding operation has been performed normally or not, wherein said current monitoring information comprises said indication.

7. An inverter resistance welding control apparatus for controlling a switching operation of an inverter such that a primary or secondary current of an inverter resistance welding machine generally matches a desired preselected current value, comprising:

clock generating means for generating a clock that defines a switching cycle of the inverter, wherein said switching cycle occurs a plurality of times during a welding operation;

limiter level preselecting means for preselecting a predetermined limiter level corresponding to the preselected current value;

current detecting means for detecting a current during the welding operation and for generating a detected current signal representative thereof;

inverter controlling means for controlling the inverter for each switching cycle such that the inverter is turned on in response to a leading edge of the clock and such that the inverter is turned off either when said detected current signal from said current detecting means has reached said limiter level or when the clock has reached a trailing edge thereof;

current measuring means for measuring, from said detected current signal, a plurality of values of said current, one for each time the inverter is turned off;

normal/defective determining means for determining, based on said measured values of said current measured by said current measuring means, whether the welding operation has been performed normally or not; and output means for outputting an indication of whether the welding operation has been performed normally or not.

8. The inverter resistance welding control apparatus of claim 7, wherein said normal/defective determining means comprises:

average value computing means for computing an average value of said measured current values provided by said current measuring means;

monitoring value preselecting means for preselecting a monitoring value; and comparing means for comparing said computed average value from said average value computing means with said monitoring value.

9. An apparatus comprising:

a first rectifying means for rectifying an AC current into a primary DC current;

an inverter means for converting the primary DC current provided by said first rectifying means into a primary pulsed AC current of a predetermined frequency;

a welding transformer for transforming the primary pulsed AC current obtained from said inverter means into a secondary pulsed AC current;

a second rectifying means for rectifying the secondary pulsed AC current from said welding transformer into a secondary DC current;

a primary current measuring means for measuring the primary DC current;

a monitoring value setting means for presetting a monitoring value which is smaller than a predetermined value of a desired current and greater than a value of a magnetizing current of said transformer;

a lack-of-current detecting means for comparing a measured value of the primary DC current obtained from said primary current measuring means with the monitoring value and for determining that there is a lack of secondary current when the measured value of the primary current is less than the monitoring value; and an alarming means for outputting predetermined alarm information in response to the determination that there is a lack of secondary current.

10. The apparatus of claim 9, wherein said alarming means comprises an alarm message displaying means for visually displaying a predetermined message that indicates a lack of secondary current.

11. The apparatus of claim 9, wherein said alarming means comprises a buzzer means for emitting a predetermined sound that indicates a lack of secondary current.

* * * * *